United States Patent [19]

Devanney, III

[11] 4,312,135
[45] Jan. 26, 1982

[54] FLUID BED COMBUSTER

[76] Inventor: John W. Devanney, III, 119 Rowayton Ave., Rowayton, Conn. 06853

[21] Appl. No.: 112,529

[22] Filed: Jan. 16, 1980

[51] Int. Cl.³ ............................................. F26B 3/08
[52] U.S. Cl. ..................... 34/10; 34/57 A; 37/57 B; 122/4 D; 432/15; 432/58
[58] Field of Search ............... 122/4D; 110/234, 245; 432/58, 15; 34/57 R, 57 A, 57 B, 10; 239/548, 557; 406/88, 89

[56] References Cited

U.S. PATENT DOCUMENTS

| | | | |
|---|---|---|---|
| 3,508,341 | 4/1970 | Price | 432/58 |
| 4,073,064 | 2/1978 | Steever et al. | 432/58 |
| 4,154,197 | 5/1979 | Costello | 122/4 D |
| 4,184,455 | 1/1980 | Talmud | 122/4 D |
| 4,207,682 | 6/1980 | Kline et al. | 34/57 A |

Primary Examiner—Larry I. Schwartz
Attorney, Agent, or Firm—Karl F. Milde, Jr.; Robert J. Eichelburg

[57] ABSTRACT

A fluid bed combustor as well as a method of making same is disclosed. The combustor comprises a chamber containing a bed of relatively inert particles supported on a substantially horizontal distributor plate, a plurality of heat extractor tubes which pass upwardly through said plate in a substantially vertical direction, said tubes being distributed substantially uniformly over all or part of the plate surface so as to permit efficient heat extraction from the entire fluid bed volume, and means for supplying combustion gas through said plate to support combustion and to fluidize the bed.

7 Claims, 2 Drawing Figures

FLUID BED COMBUSTER

BACKGROUND OF THE INVENTION

As is pointed out in "The Contribution of Fluid-Bed Technology to Energy Saving and Environmental Protection", Botterill and Virr, Applied Energy (3) (1977), fluid-bed solid fuel combustors offer certain advantages over conventional boilers. For example, a conventional power station boiler burns coal in about 40,000 times its own volume of air. Heat transfer conditions are poor—e.g. the excessive volume flow of gas removes too much heat. Temperature conditions within the combustion chamber vary substantially, with flame temperatures of about 2800° F., and this leads to regions of high corrosion. Moreover, flame is a relatively inefficient heat radiator.

The fluidized bed combustor on the other hand overcomes many of these problems. By employing hot inert solid particles (e.g. ash or sand) in the bed, heat is supplied to the fuel particles to raise them to combustion temperature. Adequate combustion oxygen is supplied through nozzles in the bed but the overall ratio of air volume to bed volume is relatively low—e.g. 1:160 as opposed to 1:40,000 for conventional boilers. The high heat capacity of the inert material, combined with the fluid or highly agitated nature of the bed, prevents the burning fuel from reaching excessive temperatures and helps maintain uniform temperatures throughout the bed. The hot inert material is, of course, an efficient means by which to transfer heat to the heat extraction tubes which pass through the bed.

The fluid bed boiler has also generated increased interest as the cost of fuels has increased and as environmental standards have become paramount. In this regard, the fluid bed combustor permits the use of high sulfur coal, which although lower in price than most other fuels, normally is either environmentally unacceptible or requires expensive pollution control apparatus. Thus, there may be added to the inert bed material crushed limestone or other known materials which convert sulfur oxides to sulfate. The sulfate is retained within the bed and may be disposed of by known means.

Most fluid bed combustors developed to date have employed horizontally oriented heat extractor tubes in the bed. Such configurations, while offering to varying degrees the advantages discussed above, are unsuited for natural circulation of the fluid within the tubes. They are also subject to tube erosion in certain temperature regimes and limited in turndown or power output control since heat transfer surface (i.e. the relative length of heat extractor tubes immersed within the bed at any given time) will not vary uniformly or directly with changes in bed depth. Horizontal tubes also generally experience lower heat transfer rates than vertical tubes.

Arrangements involving vertical bed tubes have been limited to waterwalls around the periphery of the combustion chamber and arrangements, such as disclosed in U.S. Pat. No. 3,983,927, in which the tubes are mostly vertical but do not extend through the distributor plate. In the former case, the heat extraction potential of the bed is not fully exploited; in the latter case, natural circulation is unattainable.

BRIEF SUMMARY OF THE INVENTION

The present invention takes advantage of the known benefits of fluid bed combustors while at the same time incorporating features heretofore thought to be unattainable in such apparatus. Stated briefly, the applicant has invented a fluid combustor having substantially vertical heat extraction tubes distributed substantially uniformly throughout all or part of the bed and passing through the distributor plate which supports the fluid bed. These vertically oriented tubes offer substantial advantages over the substantially horizontally oriented tubes heretofore conventionally used in fluid bed combustors. Heat transfer rates are improved in that vertically oriented tubes offer less interference to the flow of the bed particles. It has also been discovered that tube wear or erosion is substantially lessened.

Of particular importance is the capability with vertically oriented tubes to continuously and yet efficiently vary the bed height. Since the tubes are vertically oriented and extend upwardly from the distributor plate, a length of every such tube at least equal to the bed height will always be within the fluid bed. Thus the amount of heat that can be extracted by a given tube (and hence the power output of the entire system) is directly proportional to the bed height and can be continuously varied simply by varying the bed height. This capability is to be distinguished from that of conventional horizontal tube fluid bed combustors wherein a drop in the fluid bed height would successively expose entire tubes or rows of tubes and hence cause step-like (as opposed to continuous) power output reductions. By way of example, a slight reduction in bed height would not appreciably affect power output unless the drop caused one or more horizontal tubes to be exposed. Should one or more tubes be exposed, a rather abrupt drop in output would be experienced.

As noted above, the vertically oriented tubes of the present invention are also to be distinguished from the few prior instances where vertical tubes were used but were confined to the periphery of the bed (i.e. in waterwalls). The tubes according to the present invention pass through the distributor plate at points located over the entire distributor plate surface and hence extract heat substantially uniformly from the entire fluid bed.

The present invention also makes it possible to take advantage of the natural water circulation effect normally attainable in a vertically oriented system. Thus in a closed loop system the water heated in the heat extraction tubes, being less dense than cooler water returning from the condensor, naturally rises in the tubes toward the steam generating apparatus while the cooler water from which steam has been extracted falls to a drum located beneath the distributor plate to rise again through the heat extractor tubes. This natural circulation is not only highly efficient but it substantially eliminates the need for expensive pumps and the like. Again a substantial advantage is obtained not only over horizontal tube systems but over systems such as disclosed in U.S. Pat. No. 3,983,927 wherein vertical tubes do not pass through the plate.

BRIEF DESCRIPTION OF THE DRAWING

The foregoing and other features of the present invention will be more readily apparent from the following detailed description and drawings of illustrative embodiments of the invention in which.

DESCRIPTION OF EXEMPLARY EMBODIMENT

Figure 1:
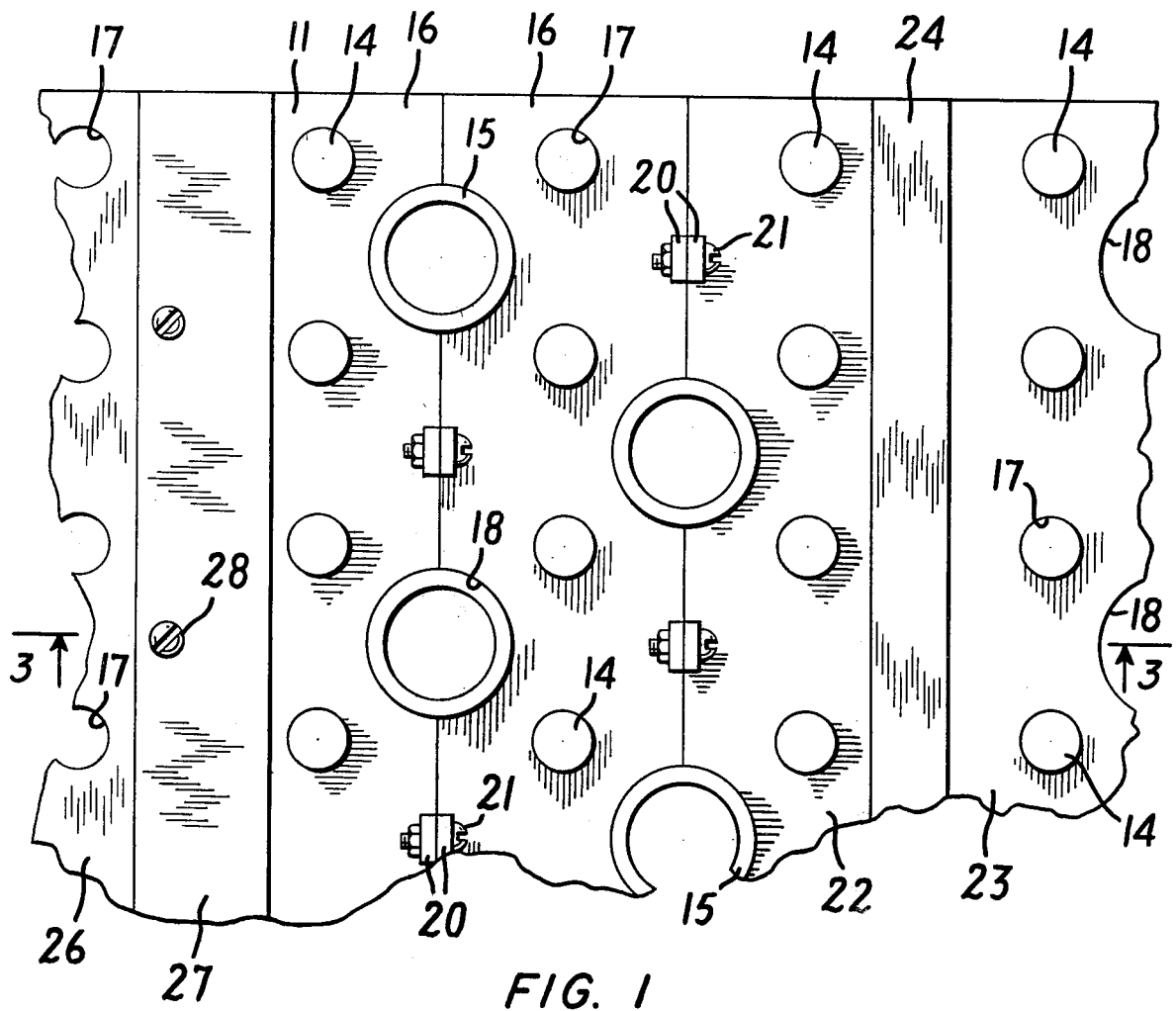
FIG. 1 is a top plan view of a portion of a distributor plate according to the invention.
Figure 2:
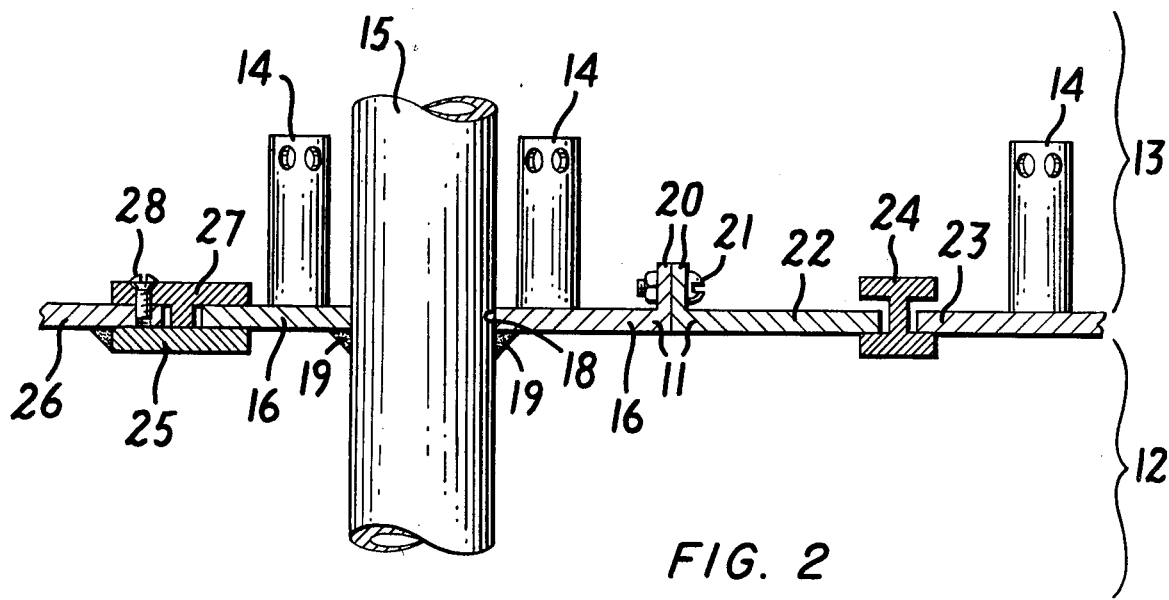
FIG. 2 is a fragmentary side view of said plate taken along line 3—3 of FIG. 1.

Looking to FIGS. 1 and 2 there is shown a distributor plate 11 which separates the interior of a combustor into a lower plenum 12 and an upper combustion zone 13. As is the case with a conventional fluid bed combustor, nozzles or holes 14 are substantially uniformly spaced over the plate surface and, as the plenum is pressurized with combustion gas, e.g. air, the combustion gas is injected through the nozzles or holes into the combustion zone 13.

In the combustion zone, a layer or bed of particulate inert material, such as sand or ash, is supported on the distributor plate 11. It is this bed which becomes "fluidized" when sufficiently raised and agitated by the combustion gases supplied through the nozzles 14. By "fluidized", a term well understood in fluid bed combustor art, it is meant that the agitated bed demonstrates properties of flow, buoyancy, etc. much like those of a fluid.

The bed has mixed therein the fuel to be burned, e.g. coal, petroleum coke or the like. The fuel is supplied to the bed by means readily apparent to one skilled in the art and such means, as well as known means for removing ash, are not discussed here or shown in the drawings.

In order to remove heat from the combustion zone, e.g. to be used to generate steam, heat extractor tubes 15, containing a vapor-generating fluid such as water, are provided. These tubes pass upwardly through the distributor plate and through the bed. In order to thus pass through the plate and bed, the tubes are substantially vertically oriented, at least in the vicinity of the plate. It will of course be apparent to one skilled in the art that the vertical orientation of the heat extractor tubes can be varied significantly-the term "vertical" being used herein to mean a direction which permits tubes to easily pass upwardly from the plenum through the distributor plate and into the combustion zone. This is to be contrasted with conventional fluid bed combustors wherein the heat extractor tubes do not pass through the distributor plate (except perhaps at a conventional waterwall) and hence must assume at least a partially horizontal orientation within the bed.

It will also be readily apparent that once the tubes pass through the plate and at least partially through the bed, they may be bent or turned to accommodate the structure and function of the particular combustor. For example, the tubes may be eventually directed to a drum above the combustion zone and beyond for purposes of extracting energy in the form of steam.

While FIGS. 1 and 2 show only the heat extractor tubes which pass through the plate, there may also be employed additional sets of tubes, which may or may not pass through the distributor plate, for purposes of pre-heating, superheating, etc. It is, nonetheless, an important feature of the invention that at least a substantial number of heat extractor tubes pass vertically through the distributor plate.

As mentioned above, in previous fluid bed combustors it was not thought to be practical to pass the heat extractor tubes vertically through the distributor plate. This was due to problems encountered with thermal expansion as well as difficulty in constructing a workable system. In the preferred embodiment of the present invention, there is provided a distributor plate which is both economical to construct and practical to use.

Again looking to FIGS. 1 and 2, the plate is comprised of a number of segments or tiles 16. These tiles have holes 17 drilled or otherwise provided therein on top of which are attached nozzles 14. While it is preferred that nozzles be employed, it should be apparent to one skilled in the art that simple perforations or the like will suffice. The nozzles communicate with the plenum and air is injected through the nozzles both to fluidize the bed and to provide combustion air.

The sides of each tile are scalloped by indentations 18 which, when aligned with corresponding indentations in an adjoining tile, form holes in the plate through which the tubes 15 pass. It can be seen from FIG. 1 that the tubes 15 are located substantially uniformly over the entire distributor plate surface and hence are capable of extracting heat from virtually the entire fluid bed volume. The individual tiles may be supported in any convenient manner such as at the ends thereof and/or by welds or projections 19 on the tubes 15.

In order to construct the plate, one simply starts at one end of the combustor and lays in a tile. A row of heat extractor tubes is then erected, each tube being set in a respective scallop in the tile followed by the laying in of the next tile. The tiles are attached to adjoining tiles by bolting, welding or any other suitable means. In the embodiment depicted, the tiles have flanges 20 through which bolts 21 are passed in order to lock adjacent tiles together.

Depending upon the overall geometry of the combustor, it is preferred that one or more expansion joints be provided in the distributor plate. In the preferred embodiment, this joint is accomplished by leaving a gap between two adjacent tiles 22, 23 and bridging this gap with an H-channel 24. As shown in FIG. 2, the H-channel 24 may be slightly larger than necessary to accommodate the tiles since this will facilitate the movement of the tiles in the H-channel. Moreover, even if slightly oversized, the H-channel does not permit significant leakage of particles from the fluid bed into the plenum since the H-channel is forced upwardly against the plate when the bed in fluidized (i.e. by the pressure in the plenum) and downwardly against the plate when the bed is slumped (i.e. by the weight of the bed). As is the case with the tiles, the H-channel may be supported in any convenient manner—e.g. at the ends.

It will also be noted from FIG. 1 that all of the tiles need not be identical. In FIG. 1, the edges of tiles 22, 23 immediately adjacent the expansion joint have no scallops. Also the location of the nozzles 14 and tubes 15 may be varied—the important consideration being that the nozzles and the tubes are spread over the distributor plate surface sufficiently so that substantially the entire bed is fluidized and heat is efficiently extracted from substantially the entire fluid bed volume.

Again depending upon the overall geometry of the combustor, an expansion gap may similarly be provided around the periphery of the distributor plate.

In order to fit in the final tile into the plate, a split channel may be provided as in FIG. 2. This split channel is comprised of a strip-portion 25 which is attached (e.g. welded) to one tile 26. A T-portion 27 of the split channel is then laid into the space between the tiles and also attached to tile 26 by a screw 28 or the like. As was the case with the H-channel 24, the split channel may be supported in the combustor in any suitable manner.

In actual operation, the bed is fluidized by the injection of air into the bed through the nozzles 14. In order to commence combustion, oil-fired burners, not shown, or other known means is used to heat the bed. When the bed is heated to about 700°–900° F., solid fuel in the form of ¾ inch or smaller chunks is introduced into the bed. Once the bed reaches a sufficiently high temperature, e.g. 1350° F., combustion in the bed will become self-supporting and the bed heating burners are then shut down.

At full power, the bed stabilizes at a temperature (e.g. about 1575° F.) below which the bed particles, including ash, tend to slag. There is thus overcome the problem of slagging (with accompanying fouling of the combustor) which is otherwise encountered in the high temperature burning of solid fuels.

As mentioned above, one of the important advantages of the combustor according to the invention is that as the bed height is varied, the power output of the system can be likewise varied in a continuous or infinite manner which is directly or lineally proportional to said bed height. This is to be contrasted with horizontal tube combustors wherein variations in the bed height result in abrupt power output changes depending upon whether tubes or rows of tubes happen to be below the bed surface.

Another advantage offered by the present invention is that it may be easily incorporated into or converted from a conventional oil fired combustor. Merely by assembling the tiles and tubes as described above, the former combustion chamber is converted into a two-chamber system comprising a plenum beneath the tile distributor plate and a fluid bed combustion zone above. This ability to convert an oil fired combustor to a fluid bed solid fuel (e.g. coal) combustor is of course of particular importance in view of the increasing cost of oil as compared to more plentiful solid fuels.

The present invention has been reduced to practice and used successfully in the form of a 1.5 million BTU/hr. combustor employing both ferritic and austenitic heat extractor tubes. This combustors has been operated at a variety of temperatures with different fuels and bed materials. It is contemplated that combustors substantially smaller or larger could also be successfully operated.

It will be appreciated that the above disclosure is illustrative only and that modifications may be made without departing from scope of the invention or the appended claims.

I claim:

1. A fluid bed combustor comprising a chamber for containing a bed of relatively inert particles and having a substantially horizontal distributor plate comprising a plurality of elongated tiles aligned adjacent one another, at least some of said tiles having scallops spaced along the side edges thereof such that when one scallop tile is placed adjacent a correspondingly scalloped tile, the scallops of said one tile will be in register with the scallops of the adjacent tile so as to form holes, a plurality of heat extractor tubes which pass upwardly through said holes in said plate in a substantially vertical direction, said tubes being distributed substantially over the entire plate surface so as to permit efficient heat extraction from the entire fluid bed volume, and means for supplying combustion gas through said plate to support combustion and to fluidize the bed.

2. A fluid bed combustor according to claim 1 wherein said means for supplying combustion gas comprises a plenum beneath said plate and nozzles or holes in said plate through which pressurized gas from the plenum may be passed into the bed.

3. A fluid bed combustor according to claims 1 or 2 wherein the combustion gas is air.

4. A fluid bed combustor according to claim 1 wherein at least two adjacent tiles are separated by an expansion joint.

5. A fluid bed combustor according to claim 4 wherein said expansion joint comprises a H-channel having channels on opposite sides thereof, said channels engaging the adjacent edges of said two tiles and being sufficiently large as to permit movement of said tiles within said channels.

6. A fluid bed combustor according to claim 1 wherein two tiles are separated by and held in place by a split channel, said split channel comprising a bottom strip portion fixedly attached to the underside of one of said tiles and extending along the side edge of said tile, said strip portion further extending outwardly from said tile so as to underlie at least a portion of said other tile, a T-portion overlying and extending along the respective near edges of both said tiles, said T-portion being attached to said one of said tiles.

7. A method of constructing a fluid bed combustor comprising providing a distributor plate and heat extractor tube arrangement in a chamber and including the steps of supporting within said chamber a first elongated tile, said tile having along its edge scallops, thereafter erecting a row of substantially vertically oriented heat extractor tubes, each tube being set in a respective scallop, thereafter laying in and supporting a next tile, said next tile having scallops corresponding to and in register with the respective scallops in said first tile such that holes are provided in the plate thereby formed from said tiles through which said tubes are passed; thereafter alternately erecting and laying in respective rows of tubes and tiles so as to form a plate having heat extractor tubes spaced substantially over the entire plate surface, said plate separating the chamber into a lower plenum and an upper combustion zone, said plate further having nozzles or holes spaced substantially over the entire plate surface, said nozzles or holes adapted to supply gas from said plenum into said combustion zone so as to support combustion and to fluidize a bed of particulate matter supported on said plate.

* * * * *